(12) United States Patent
Armijo et al.

(10) Patent No.: US 10,703,042 B2
(45) Date of Patent: Jul. 7, 2020

(54) SYSTEMS FOR ADDITIVE MANUFACTURING USING FEEDSTOCK SHAPING

(71) Applicant: Arevo, Inc., Santa Clara, CA (US)

(72) Inventors: Armando Armijo, San Diego, CA (US); Hemant Bheda, Saratoga, CA (US); Chandrashekar Mantha, Santa Clara, CA (US); Wiener Mondesir, Oakland, CA (US); Sohil Nandu, Sunnyvale, CA (US); Riley Reese, Sunnyvale, CA (US)

(73) Assignee: Arevo, Inc., Milpitas, CA (US)

( * ) Notice: Subject to any disclaimer, the term of this patent is extended or adjusted under 35 U.S.C. 154(b) by 0 days.

(21) Appl. No.: 16/033,041

(22) Filed: Jul. 11, 2018

(65) Prior Publication Data

US 2019/0009461 A1    Jan. 10, 2019

Related U.S. Application Data

(63) Continuation of application No. 15/471,786, filed on Mar. 28, 2017, now Pat. No. 10,052,813.
(Continued)

(51) Int. Cl.
| | |
|---|---|
| *B29C 70/38* | (2006.01) |
| *B29C 64/118* | (2017.01) |
| *B29C 64/20* | (2017.01) |
| *B33Y 10/00* | (2015.01) |
| *B33Y 30/00* | (2015.01) |
| *B33Y 50/02* | (2015.01) |
| *B29C 64/188* | (2017.01) |

(Continued)

(52) U.S. Cl.
CPC ............ *B29C 64/20* (2017.08); *B29C 64/118* (2017.08); *B29C 64/188* (2017.08); *B29C 64/268* (2017.08); *B29C 70/384* (2013.01); *B33Y 10/00* (2014.12); *B33Y 30/00* (2014.12); *B33Y 50/02* (2014.12); *B29C 64/218* (2017.08); *B29C 64/393* (2017.08)

(58) Field of Classification Search
CPC .............................. B22F 3/008; B22F 3/1055
USPC .......................................................... 700/98
See application file for complete search history.

(56) References Cited

U.S. PATENT DOCUMENTS

| | | |
|---|---|---|
| 5,121,329 A | 6/1992 | Crump |
| 5,578,227 A | 11/1996 | Rabinovich |

(Continued)

FOREIGN PATENT DOCUMENTS

| | | |
|---|---|---|
| EP | 3045992 A1 | 7/2016 |
| EP | 3051445 A1 | 8/2016 |

(Continued)

OTHER PUBLICATIONS

PCT/US2018/030785 International Search Report and Written Opinion dated Sep. 28, 2018.

(Continued)

*Primary Examiner* — Benjamin A Schiffman
(74) *Attorney, Agent, or Firm* — Wilson Sonsini Goodrich Rosati; Jing Wang

(57) ABSTRACT

A method and apparatus for additive manufacturing wherein a fiber composite filament having an arbitrarily shaped cross section is softened and then flattened to tape-like form factor for incorporation into a part that is being additively manufactured.

20 Claims, 4 Drawing Sheets

Related U.S. Application Data

(60) Provisional application No. 62/314,000, filed on Mar. 28, 2016.

(51) Int. Cl.
  *B29C 64/268* (2017.01)
  *B29C 64/218* (2017.01)
  *B29C 64/393* (2017.01)

(56) References Cited

U.S. PATENT DOCUMENTS

| | | |
|---|---|---|
| 6,004,124 A | 12/1999 | Swanson et al. |
| 6,054,077 A | 4/2000 | Comb et al. |
| 6,391,251 B1 | 5/2002 | Keicher et al. |
| 6,441,342 B1 | 8/2002 | Hsu |
| 7,024,272 B2 | 4/2006 | Thomas et al. |
| 7,483,818 B2 | 1/2009 | Amakai et al. |
| 7,896,209 B2 | 3/2011 | Batchelder et al. |
| 7,897,074 B2 | 3/2011 | Batchelder et al. |
| 8,308,876 B2 | 11/2012 | Woods et al. |
| 8,465,111 B2 | 6/2013 | Swanson et al. |
| 8,647,102 B2 | 2/2014 | Swanson et al. |
| 8,808,603 B2 | 8/2014 | Swanson |
| 8,920,697 B2 | 12/2014 | Mikulak et al. |
| 9,102,099 B1 | 8/2015 | Karpas et al. |
| 9,126,367 B1 | 9/2015 | Mark et al. |
| 9,156,205 B2 | 10/2015 | Mark et al. |
| 9,174,389 B2 | 11/2015 | Swanson |
| 9,254,535 B2 | 2/2016 | Buller et al. |
| 9,321,609 B2 | 4/2016 | Koop et al. |
| 9,327,452 B2 | 5/2016 | Mark et al. |
| 9,327,453 B2 | 5/2016 | Mark et al. |
| 9,339,972 B2 | 5/2016 | Gordon |
| 9,353,481 B2 | 5/2016 | Gupta et al. |
| 9,533,451 B2 | 1/2017 | Folgar et al. |
| 9,579,851 B2 | 2/2017 | Mark et al. |
| 9,579,891 B2 | 2/2017 | Hayashi et al. |
| 9,592,660 B2 | 3/2017 | Reese et al. |
| 9,595,037 B2 | 3/2017 | Glasgow et al. |
| 9,656,429 B1 | 5/2017 | Mantha et al. |
| 9,724,877 B2 | 8/2017 | Flitsch et al. |
| 9,738,030 B2 | 8/2017 | Lee et al. |
| 9,757,880 B2 | 9/2017 | Rothfuss et al. |
| 9,796,140 B2 | 10/2017 | Page et al. |
| 9,815,268 B2 | 11/2017 | Mark et al. |
| 10,052,813 B2 | 8/2018 | Armijo et al. |
| 2005/0098260 A1 | 5/2005 | Chen et al. |
| 2010/0312364 A1 | 12/2010 | Eryilmaz et al. |
| 2013/0101728 A1 | 4/2013 | Keremes et al. |
| 2013/0255346 A1 | 10/2013 | Danby et al. |
| 2013/0316081 A1 | 11/2013 | Kovalcik et al. |
| 2014/0232035 A1 | 8/2014 | Bheda |
| 2014/0265035 A1 | 9/2014 | Buser et al. |
| 2014/0268604 A1 | 9/2014 | Wicker et al. |
| 2014/0277669 A1 | 9/2014 | Nardi et al. |
| 2014/0291886 A1 | 10/2014 | Mark et al. |
| 2014/0328963 A1 | 11/2014 | Mark et al. |
| 2014/0361460 A1 | 12/2014 | Mark |
| 2014/0371895 A1 | 12/2014 | Sadusk et al. |
| 2015/0045928 A1 | 2/2015 | Perez et al. |
| 2015/0052025 A1 | 2/2015 | Apsley et al. |
| 2015/0097308 A1 | 4/2015 | Batchelder et al. |
| 2015/0246481 A1 | 9/2015 | Schlick et al. |
| 2015/0251356 A1 | 9/2015 | Batchelder et al. |
| 2015/0273583 A1 | 10/2015 | Bumgardner |
| 2015/0298393 A1 | 10/2015 | Suarez |
| 2015/0314532 A1 | 11/2015 | Gordon et al. |
| 2015/0321255 A1 | 11/2015 | Colin et al. |
| 2015/0321422 A1 | 11/2015 | Boyer |
| 2015/0328839 A1 | 11/2015 | Willis et al. |
| 2015/0331402 A1 | 11/2015 | Lin et al. |
| 2015/0336292 A1 | 11/2015 | Mikulak et al. |
| 2015/0360288 A1 | 12/2015 | Zalewski et al. |
| 2016/0031159 A1 | 2/2016 | Church et al. |
| 2016/0038655 A1 | 2/2016 | Weisman et al. |
| 2016/0046081 A1 | 2/2016 | Kim et al. |
| 2016/0075091 A1 | 3/2016 | Cable |
| 2016/0082641 A1 | 3/2016 | Bogucki et al. |
| 2016/0129643 A1 | 5/2016 | Mark et al. |
| 2016/0136885 A1 | 5/2016 | Nielsen-Cole et al. |
| 2016/0136887 A1 | 5/2016 | Guillemette et al. |
| 2016/0144564 A1 | 5/2016 | Padgett et al. |
| 2016/0144565 A1 | 5/2016 | Mark et al. |
| 2016/0144566 A1 | 5/2016 | Mark et al. |
| 2016/0151833 A1 | 6/2016 | Tsao |
| 2016/0159012 A1 | 6/2016 | Lee et al. |
| 2016/0184925 A1 | 6/2016 | Huang et al. |
| 2016/0185028 A1 | 6/2016 | Bogue et al. |
| 2016/0236279 A1 | 8/2016 | Ashton et al. |
| 2016/0236414 A1 | 8/2016 | Reese et al. |
| 2016/0236416 A1 | 8/2016 | Bheda et al. |
| 2016/0236419 A1 | 8/2016 | Griffin et al. |
| 2016/0243649 A1 | 8/2016 | Zheng et al. |
| 2016/0257068 A1 | 9/2016 | Albert et al. |
| 2016/0266573 A1 | 9/2016 | Bheda et al. |
| 2016/0271880 A1 | 9/2016 | Bheda et al. |
| 2016/0288264 A1 | 10/2016 | Jones et al. |
| 2016/0297142 A1 | 10/2016 | Bheda et al. |
| 2016/0297935 A1 | 10/2016 | Reese et al. |
| 2016/0303805 A1 | 10/2016 | Chen et al. |
| 2016/0311165 A1 | 10/2016 | Mark et al. |
| 2016/0325491 A1 | 11/2016 | Sweeney et al. |
| 2016/0332366 A1 | 11/2016 | Donovan |
| 2016/0332380 A1 | 11/2016 | De Pena et al. |
| 2016/0346998 A1 | 12/2016 | Mark et al. |
| 2016/0361869 A1 | 12/2016 | Mark et al. |
| 2016/0368213 A1 | 12/2016 | Mark |
| 2017/0021455 A1 | 1/2017 | Dallarosa et al. |
| 2017/0021565 A1 | 1/2017 | Deaville |
| 2017/0036403 A1 | 2/2017 | Ruff et al. |
| 2017/0057160 A1 | 3/2017 | Duty et al. |
| 2017/0057167 A1 | 3/2017 | Van Tooren et al. |
| 2017/0072633 A1 | 3/2017 | Hsu |
| 2017/0080642 A1 | 3/2017 | Tyler |
| 2017/0096576 A1 | 4/2017 | Bheda et al. |
| 2017/0120519 A1 | 5/2017 | Mark |
| 2017/0144375 A1 | 5/2017 | Waldrop, III et al. |
| 2017/0145155 A1 | 5/2017 | Wright et al. |
| 2017/0146489 A1 | 5/2017 | Redding et al. |
| 2017/0151704 A1 | 6/2017 | Go et al. |
| 2017/0151728 A1 | 6/2017 | Kunc et al. |
| 2017/0151731 A1 | 6/2017 | Ho Yew Chi et al. |
| 2017/0157843 A1 | 6/2017 | Nystrom et al. |
| 2017/0173868 A1 | 6/2017 | Mark |
| 2017/0173883 A1 | 6/2017 | Gray et al. |
| 2017/0197371 A1 | 7/2017 | Fetfatsidis et al. |
| 2017/0210074 A1 | 7/2017 | Ueda et al. |
| 2017/0247553 A1 | 8/2017 | Ganapathiappan et al. |
| 2017/0266885 A1 | 9/2017 | Gifford et al. |
| 2017/0274585 A1 | 9/2017 | Armijo et al. |
| 2017/0304894 A1 | 10/2017 | Buller |
| 2017/0326802 A1 | 11/2017 | Mark et al. |
| 2017/0368748 A1 | 12/2017 | De Pena et al. |
| 2018/0001550 A1 | 1/2018 | Zhao et al. |
| 2018/0243978 A1 | 8/2018 | Nguyen et al. |
| 2018/0272460 A1 | 9/2018 | Nelson et al. |
| 2019/0134750 A1 | 5/2019 | Nauka et al. |

FOREIGN PATENT DOCUMENTS

| | | |
|---|---|---|
| EP | 3148711 A1 | 4/2017 |
| EP | 3150361 A1 | 4/2017 |
| GB | 2453945 A | 4/2009 |
| KR | 100847550 B1 | 7/2008 |
| KR | 20130060144 A | 6/2013 |
| KR | 101451794 B1 | 10/2014 |
| WO | WO-2014193505 A1 | 12/2014 |
| WO | WO-2015009938 A1 | 1/2015 |
| WO | WO-2015042422 A1 | 3/2015 |
| WO | WO-2015119819 A2 | 8/2015 |
| WO | WO-2015130401 A2 | 9/2015 |
| WO | WO-2015163776 A1 | 10/2015 |
| WO | WO-2015164954 A1 * | 11/2015 |
| WO | WO-2015193819 A2 | 12/2015 |

(56) References Cited

FOREIGN PATENT DOCUMENTS

| WO | WO-2016142472 A1 | 9/2016 |
|---|---|---|
| WO | WO-2016187106 A1 | 11/2016 |
| WO | WO-2017008789 A1 | 1/2017 |
| WO | WO-2017100783 A1 | 6/2017 |
| WO | WO-2017123726 A1 | 7/2017 |
| WO | WO-2017149896 A1 | 9/2017 |
| WO | WO-2017210490 A1 | 12/2017 |
| WO | WO-2018182773 | 10/2018 |
| WO | WO-2018204574 | 11/2018 |
| WO | WO-2018217650 A1 | 11/2018 |
| WO | WO-2019050509 | 3/2019 |

OTHER PUBLICATIONS

U.S. Appl. No. 15/845,629 Office Action dated Oct. 19, 2018.
U.S. Appl. No. 15/845,673 Office Action dated Oct. 19, 2018.
U.S. Appl. No. 15/845,762 Office Action dated Oct. 19, 2018.
U.S. Appl. No. 15/845,843 Office Action dated Oct. 19, 2018.
PCT/US2018/033710 International Search Report and Written Opinion dated Oct. 31, 2018.
U.S. Appl. No. 15/587,292 Office Action dated Feb. 6, 2019.
Clausen, et al. Exploiting Additive Manufacturing Infill in Topology Optimization for Improved Buckling Load. Engineering 2.2 (2016): 250-257.
Co-pending U.S. Appl. No. 15/587,292, filed May 4, 2017.
Co-pending U.S. Appl. No. 15/845,629, filed Dec. 18, 2017.
Co-pending U.S. Appl. No. 15/845,673, filed Dec. 18, 2017.
Co-pending U.S. Appl. No. 15/845,762, filed Dec. 18, 2017.
Co-pending U.S. Appl. No. 15/845,843, filed Dec. 18, 2017.
International search report and written opinion dated Aug. 17, 2017 for PCT Application No. PCT/US2017/035551.
International search report and written opinion dated Nov. 22, 2017 for PCT Application No. PCT/US2017/045986.
Notice of allowance dated Jan. 4, 2017 for U.S Appl. No. 15/232,767.
Notice of allowance dated Apr. 27, 2017 for U.S Appl. No. 15/232,767.
Notice of allowance dated Nov. 30, 2017 for U.S Appl. No. 14/623,471.
Office action dated Mar. 30, 2017 for U.S Appl. No. 14/623,471.
Office action dated Aug. 30, 2017 for U.S Appl. No. 14/623,471.
Office action dated Sep. 14, 2017 for U.S. Appl. No. 14/621,205.
Office action dated Nov. 14, 2016 for U.S. Appl. No. 15/232,767.
PCT/US2017/050153 International Search Report and Written Opinion dated May 24, 2018.
PCT/US2017/050155 International Search Report and Written Opinion dated Dec. 7, 2017.
U.S. Appl. No. 15/471,786 Notice of Allowance dated Jun. 27, 2018.
U.S. Appl. No. 15/471,786 Notice of Allowance dated Feb. 7, 2018.
U.S. Appl. No. 15/471,786 Office Action dated Aug. 23, 2017.
U.S. Appl. No. 15/845,629 Office Action dated Apr. 13, 2018.
U.S. Appl. No. 15/845,673 Office Action dated Apr. 11, 2018.
U.S. Appl. No. 15/845,762 Office Action dated Apr. 6, 2018.
U.S. Appl. No. 15/845,843 Office Action dated Apr. 3, 2018.
Wong, et al. A review of additive manufacturing. ISRN Mechanical Engineering 2012.
Wu, et al. Infill Optimization for Additive Manufacturing—Approaching Bone-like Porous Structures. IEEE Transactions on Visualization and Computer Graphics (2017).
Zhang, et al. Study on Metamorphic Rolling Mechanism for Metal Hybrid Additive Manufacturing. The 24th international SFF symposium—an additive manufacturing conference. Aug. 2013.
U.S. Appl. No. 15/845,843 Office Action dated Mar. 8, 2019.
U.S. Appl. No. 15/845,629 Office Action dated Apr. 19, 2019.
U.S. Appl. No. 15/845,673 Office Action dated Apr. 19, 2019.
U.S. Appl. No. 15/845,762 Office Action dated May 3, 2019.
Co-pending U.S. Appl. No. 16/672,025, filed Nov. 1, 2019.
Co-pending U.S. Appl. No. 16/688,320, filed Nov. 19, 2019.
EP17807520.6 The Extended European Search Report dated Dec. 6, 2019.
U.S. Appl. No. 15/845,629 Office Action dated Nov. 1, 2019.
U.S. Appl. No. 15/845,673 Office Action dated Dec. 27, 2019.
U.S. Appl. No. 15/845,762 Office Action dated Nov. 1, 2019.
U.S. Appl. No. 15/845,843 Office Action dated Dec. 27, 2019.
U.S. Appl. No. 15/587,292 Office Action dated Aug. 2, 2019.

* cited by examiner

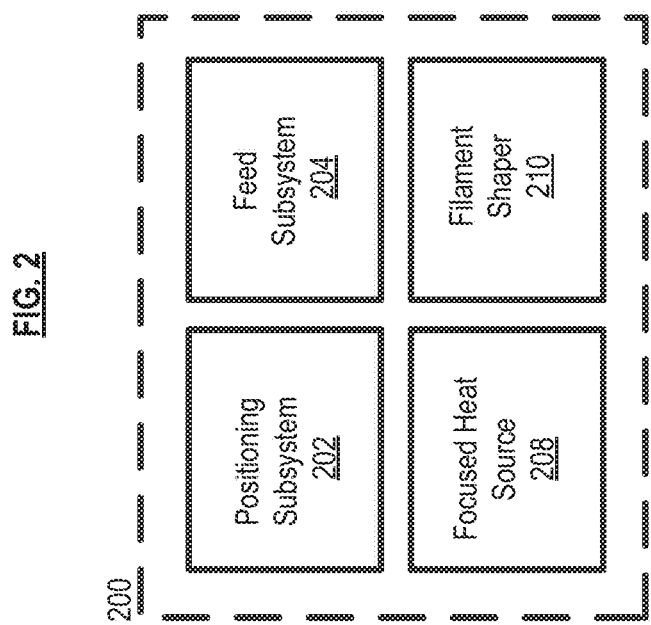

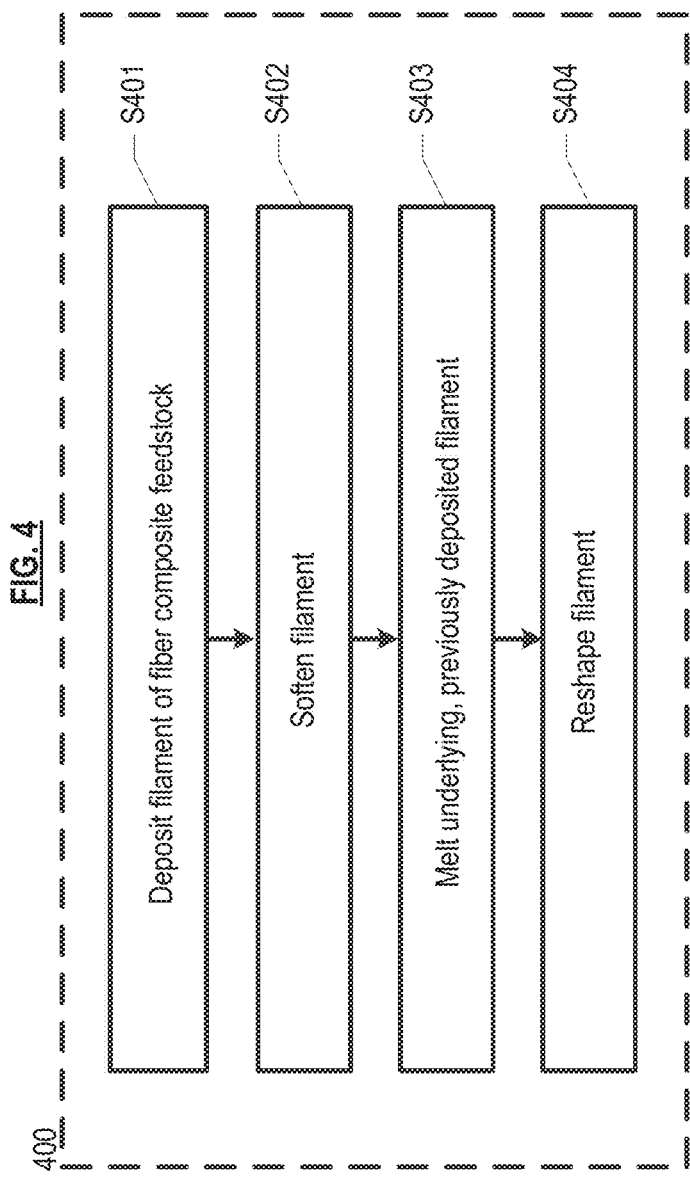

SYSTEMS FOR ADDITIVE MANUFACTURING USING FEEDSTOCK SHAPING

CROSS-REFERENCE TO RELATED APPLICATIONS

The present application is a continuation of U.S. patent application Ser. No. 15/471,786, filed Mar. 28, 2017, now U.S. Pat. No. 10,052,813, which claims the benefit of U.S. Provisional Patent Application No. 62/314,000, filed Mar. 28, 2016, each of which is incorporated by reference herein in their entirety.

FIELD OF THE INVENTION

The present invention generally relates to an additive manufacturing process using fiber composites.

BACKGROUND OF THE INVENTION

Additive manufacturing—so called "3D printing"—is the term given to processes that manufacture objects via sequential-layer material addition/joining throughout a 3D work envelope under automated control. ISO/ASTM52900-15 defines seven categories of additive manufacturing processes: binder jetting, directed energy deposition, material extrusion, material jetting, powder bed fusion, sheet lamination, and vat polymerization.

Composite 3D printing processes produce an object or part (hereinafter collectively "part") by depositing composite filaments made of continuous fiber-reinforced thermoplastics, which quickly harden to form a layer. Successive layers of material are deposited to build the object.

A fiber composite consists of fibers as the discontinuous phase, a matrix (typically a resin) as the continuous phase, and an interface region (the interface). The strength of a fiber composite is determined by the wettability of the fiber within the resin matrix. Wettability refers to the degree of adhesion and bonding between the resin and the fibers. A high degree of wetting means the resin has good surface adhesion to the fibers, coating the fibers uniformly. A low degree of wetting means the fibers are not completely coated by resin, resulting in void space or bubbles between the fiber and resin.

When subjected to stress, a composite part with a high degree of wetting will effectively transfer the stress to the fibers through the resin matrix. This composite part then has a much higher tensile strength as compared to a part made only of resin material. In comparison, a composite part with a low degree of wetting will experience fiber pullout when subjected to stress. Fiber pullout results in ineffective stress transfer from the resin matrix to the fibers due to the void space at the fiber/resin interfaces. The void space acts as nucleating sites for cracks, resulting in premature failure of the part via crack propagation. The composite part with a low degree of wetting has a lower tensile strength as compared to a part made only of the resin material due to the higher void space with this composite part.

To ensure a high degree of wetting, the composites industry mostly uses thermoset (e.g., epoxy, etc.) resin systems. Thermosets typically have a low viscosity compared to other polymers, resulting in high melt flow and a high degree of fiber wetting. While thermoset resins provide sufficient wetting, they cannot tolerate higher operating temperatures, often limited to 100° C. or less. As compared to thermosets, thermoplastics generally have a higher viscosity, making it more difficult to achieve sufficient fiber wetting; however, thermoplastics offer higher tensile strength and stiffness, higher toughness, and a higher operating temperature as compared to thermoset resins.

U.S. patent application Ser. No. 14/184,010 discloses an apparatus for manufacturing an object having a deposition head including a nozzle for heating thermoplastic composite material having one or more fiber strands. In some embodiments, the apparatus also includes a turntable, a robotic arm for moving the deposition head, and spools of composite filament.

That invention involved the use of a heated extrusion nozzle to melt and deposit thermoplastic fiber-composite filament. The composite feed filament comprises thousands (e.g., 1K, 3K, 6K, 12K, 24K, etc.) of continuous fibers impregnated with thermoplastic resin. The continuous fiber includes, without limitation, carbon, fiberglass, aramid (AKA Kevlar), and carbon nanotubes (CNT). The composite filament has a cylindrical, elliptical, or rectangular cross section. In the case of a rectangular cross section, the aspect ratio (width-to-thickness) is about 3:2; that is, it is distinguishable from a tape, which is significantly wider than it is thick.

That deposition process completely melts the thermoplastic filament as it contacts the nozzle. As the continuous filament is pushed through the nozzle, the pressure of the nozzle forces the polymer underneath the continuous carbon fiber tow, which can result in exposed fiber on the top surface. As a result, there is a loss of fiber adhesion within the polymer matrix and the wetting of the fibers by the polymer is reduced.

In addition to a loss of wetting, this type of deposition involves a 90-degree bend between the nozzle and part being manufactured, which can cause fiber breakage and damage. More specifically, as the fibers bend around a 90-degree angle in the melt phase, the fibers become twisted and tangled together. The twisting and tangling of the fibers can cause them to break, reducing the overall strength and stiffness of the deposited material. The twisting and tangling further reduces the wetting of the fibers and also produces an uneven, rough surface finish.

Therefore, a need exists for way to improve the mechanical properties, surface fidelity, and finish of additively manufactured thermoplastic fiber composite parts.

SUMMARY

The present invention provides a way to improve properties of additively manufactured parts in comparison to the prior art.

In accordance with the illustrative embodiment, a fiber composite filament (towpreg) having an arbitrarily shaped cross section, which is typically circular, ellipsoidal, or rectangular (hereinafter "substantially circular") is softened and then flattened, increasing its aspect ratio (width-to-thickness). In particular, whereas the feed filament will have an aspect ratio of about 1 (for circular filaments) to about 1.5 (typical for rectangular composite filaments), the flattened filament will typically have an aspect ratio of at least about 5. That is, the flattened filament will have a tape-like form factor, wherein its width is noticeably greater than its thickness.

In the illustrative embodiment, the filament is flattened via a shaper, such as a roller, which applies a compressive force to the filament. A focused heat source, which in the illustrative embodiment is a laser (e.g., diode, fiber, etc.), first softens and eventually melts at least a portion of the composite filament.

Compared to the prior-art processes, embodiments in accordance with the present provide certain advantages. For example, with respect to processing fiber-composite feedstocks via a heated nozzle, the loss of wetting and fiber breakage issues that plague such processes are substantially avoided. In particular, because the filament material is not completely melted, resin does not flow out of the carbon fiber. This prevents or reduces the loss of wetting associated with complete melting as in the prior art.

Furthermore, the flattened shape is desired for a deposited composite filament, because this shape is more conducive to the additive manufacturing process and produces parts with better material properties as compared to deposited composite having a circular or elliptical cross section. Notwithstanding the tape-like form that results after flattening, embodiments of the invention do not suffer from the shortcomings, discussed below, of prior-art molding processes that use a tape-based feedstock, such as AFP (automated fiber placement), ATL (automated tape layup), and FW (filament winding).

In AFP, thin tapes having a rectangular cross section (c.a. 0.250 inches wide by 0.006 inches thick) are sequentially placed onto a form or mold to create an object. Among any other reasons, the tape form factor is used so that tapes may be placed adjacent to each other, thereby covering the entire surface of the mold while maintaining conformability of the individual strips. The cross section of the tape is not typically changed during processing (typically, there is no way to do so). Furthermore, it would be undesirable to alter the cross section, because this would change the positioning of the tape. The positioning of the tape must be maintained so as to minimize gaps or overlaps between strips of tapes. These tapes are limited in their ability to be "steered" or turned in-plane, driving the industry towards narrower and narrower tapes (to enable a measure of steering) while maintaining their thickness.

ATL is an architecturally identical process to AFP, but uses relatively wider tapes (>3") than AFP while maintaining the typical thickness (c.a. 0.006 inches). This process is functionally limited to producing objects with relatively large curvatures, wherein only minimal steering of the tape is possible.

In the FW process, a fiber is wound around a cylindrical mandrel. The consolidation force is applied via fiber tension. This limits objects produced via this process to convex, closed-section geometries and prohibits in-plane steering (all fiber paths must typically follow a geodesic path). Furthermore, the ability to apply process heat to the incoming material is severely limited, making in-situ consolidation of high-temperature thermoplastics exceedingly difficult.

Because the composite filament is not flattened prior to deposition in embodiments of the invention, it is easy to steer or otherwise place the filament in any location in space, enabling the printing of parts that include both open and closed cross section with highly contoured geometries and small radii corners that are not possible with tape based methods. Thus, the tape-like form of the composite filament is acquired after each segment of the filament is positioned. Consider, for example, the forms depicted in FIGS. 1A through 1D.

FIG. 1A depicts a composite filament being steered, on edge, in a spiral path (3 dimensions), such as for forming ducts or coil springs, in accordance with some embodiments of the invention. FIG. 1B depicts a composite filament being steered in a serpentine path (2 dimensions), such as for forming a flat spring, in accordance with some embodiments of the invention. FIG. 1C depicts a composite filament being steered to form objects having "T-" or "L-" shaped profiles, such as objects with sharp inside or outside corners. And FIG. 1D depicts an undulating surface, which can be a surface of part formed via the ability to steer composite filaments as described herein.

At the same time, embodiments of the invention avoid the problems associated with depositing a composite filament through a heated nozzle (loss of wetting, etc.). Additionally, better inter-laminar strength is achieved than in the prior art since additional polymer-bonding mechanisms are utilized. In particular, the polymer is more thoroughly intermixed with the substrate improving heat transfer and bonding. Furthermore, controlling the compaction force (via positioning of a robotic arm, etc.) in accordance with embodiments of the invention enables the width (and thickness) of a deposited filament to be varied, as needed, rather than being limited by a fixed tape width, as in the AFP, ATL, or FW processes.

The prior-art processes discussed above cannot manufacture parts in such fashion or with such surface features or, as in the case with additive manufacturing through a heated nozzle, are likely to result in objects having compromised final properties.

BRIEF DESCRIPTION OF THE DRAWINGS

FIG. 2 depicts a block diagram of the salient components of an additive manufacturing system that employs composite filament shaping in accordance with an illustrative embodiment of the present invention.

FIG. 4 depicts a method for additive manufacturing in accordance with an illustrative embodiment of the present invention.

DETAILED DESCRIPTION OF THE INVENTION

Figure 1A:
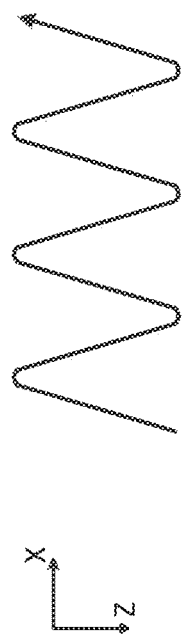
FIGS. 1A-1D depict various paths that can be followed, and profiles and surfaces that can be formed, via embodiments of the present invention.
Figure 1B:
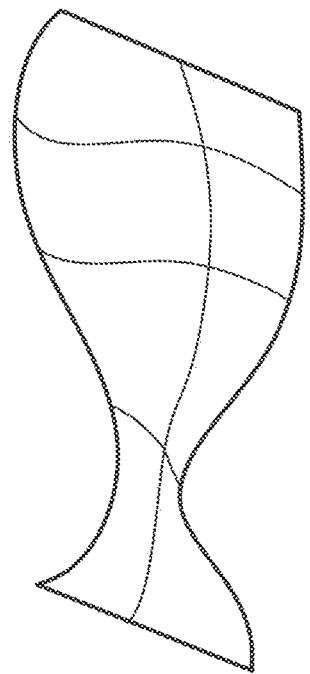
Figure 1C:
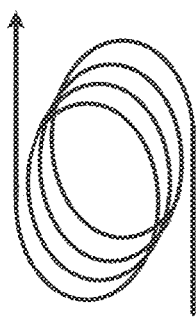
Figure 1D:
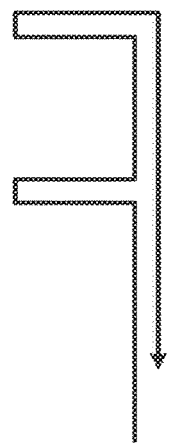

FIG. 2 depicts the salient functional elements of deposition system 200 in accordance with the present invention. Included in system 200 are positioning subsystem 202, feed subsystem 204, focused heat source 206, and shaper 210.

In the illustrative embodiment, positioning subsystem 202 comprises a multi-axis end effector (e.g., robotic arm, etc.). In the illustrative embodiment, the multi-axis end effector has sufficient degrees of freedom (i.e., six DOF) to enable true three-dimensional printing. That is, the positioning subsystem is capable of delivering a feed filament to an arbitrary location in space, as specified in accordance with the build instructions. This enables system 200 to print along the natural loading contours of an part. Printing with such a multi-axis end effector is described, for example, in Ser. No. 14/184,010, previously referenced and incorporated by reference herein.

In some other embodiments, positioning subsystem 202 comprises a gantry having one or two translational degrees of freedom (x and/or y axes). In some of such embodiments, a build plate, on which the part is printed, is also considered to be part of the positioning subsystem. In such embodiments, the build plate is movable in the z direction (and possibly the x or y direction depending on gantry capabilities), such that three degrees of freedom are provided for the build. In some further embodiments, a robotic arm can be supported by a gantry. It is within the capabilities of those skilled in the art to design or specify a robotic arm, other multi-axis end effector, or gantry system to provide the requisite functionality for system 200.

Feed subsystem 204 delivers a filament to a build surface e.g., a build plate, previously deposited layers of filament, etc.). In the illustrative embodiment, the composite filament is a cylindrical towpreg consisting of a continuous fiber (e.g., 1K, 3K, 6K, 12K, 24K, etc.) impregnated with thermoplastic resin. The continuous fiber includes, without limitation, carbon, fiberglass, aramid (AKA Kevlar), or carbon nanotubes (CNT).

The thermoplastic can be a semi-crystalline polymer or a mixture of a semi-crystalline polymer and an amorphous polymer. The semi-crystalline material can be, for example and without limitation, a polyaryletherketone (PAEK), such as polyetherketone (PEK), polyetheretherketone (PEEK), polyetherketoneketone (PEKK), polyetheretherketoneketone (PEEKK), and polyetherketoneetherketoneketone (PEKEKK). The semi-crystalline polymer can also be other semi-crystalline thermoplastics, for example and without limitation, polyamide (PA), polybutylene terephthalate (PBT), poly(p-phenylene sulfide) (PPS).

In embodiments in which the feed is a blend of an amorphous polymer with a semi-crystalline polymer, the semi-crystalline polymer can be one of the aforementioned materials and the amorphous polymer can be a polyarylsulfone, such as polysulfone (PSU), polyethersulfone (PESU), polyphenylsulfone (PPSU), polyethersulfone (PES), polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), and polycarbonate (PC).

In the blend, the weight ratio of semi-crystalline material to amorphous material is in a range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application is primarily a function of the materials used and the properties desired for the printed part.

Focused heat source 206 provides accurate control of the processing temperature of the composite filament. In the illustrative embodiment, the focused heat source is a laser. The beam spot size of a laser is precisely controllable. In accordance with the illustrative embodiment, such precise control of beam-spot size enables the laser to be aligned to heat at least a portion of a previously deposited (underlying) layer of filament to melting while, at the same time, softening (but not melting) or only partially melting the filament being deposited.

In the illustrative embodiment, focused heat source 206 precisely heats the composite filament above its glass transition temperature up to its melting temperature. In the illustrative embodiment, the resin in the composite filament is either not melted, or not completely melted, such that resin does not flow (or flow minimally) out of the filament (e.g., carbon fiber, etc.). This prevents or reduces the loss of wetting associated with movement of the polymer resin out of the fiber, as previously discussed. The temperature at which any particular composite filament feedstock softens is a function of its composition. Those skilled in the art can readily determine a desired "softening" temperature by simple experimentation.

After softening, the composite filament is reshaped. In particular, the composite filament is flattened so that it acquires a more tape-like form. As previously noted, the flattened form is desirable for a composite filament because this shape is conducive to the additive manufacturing process and produces parts with better material properties as compared to those built from composite filaments having substantially circular cross sections.

In some embodiments of the invention, the underlying filament is at least partially melted. By doing so, the bonding and adhesion between the underlying filament and the just-deposited, overlying filament increases, enhancing the overall mechanical properties of the nascent part.

In some embodiments in which the underlying filament is at least partially melted, the portion that is partially melted is the portion adjacent to the overlying filament. In some embodiments, a portion of the just-deposited (overlying) filament is melted. In some of such embodiments, the melted portion is the "lower" portion of the composite filament. Thus, in some embodiments, an "upper" portion of the underlying filament is melted and a "lower" portion of the overlying filament is melted. It is to be understood that the fiber doesn't melt; rather, the thermoplastic in and around the fiber melts.

In some embodiments, about 10 percent to about 50 percent of the original (unflattened) thickness of the overlying composite filament is melted. In other words, in some embodiments, up to about one-half of the composite fiber (the lower half) is melted.

It is very difficult or impossible to exercise the precise control over temperature profiles that is required to maintain wettability and provide the partial melting described above when using a conventional heat source (e.g., a conductive heating element, directed hot air, etc.). Hence, in the illustrative embodiment, focused heat source 206 is used to provide precisely controlled heating of a just-deposited composite filament as well as an underlying composite filament.

In some alternative embodiments, other focused heated sources may suitably be used, such as, without limitation, a concentrated microwave source (MASER), focused ultrasonic sound, focused infrared radiation, ion beam, and electron beam.

Shaper 210 applies "downward-directed" pressure to the softened/partially melted filament, thereby controlling its position/location and altering its cross section from substantially circular to a flattened form. As used in this disclosure and the appended claims, the term "flattened" means that the width of the composite fiber is at least 5 times greater than its thickness. Furthermore, the term "flattened" includes cross sections that are not literally "flat-rectangular," including, without limitation, plano-convex, plano-concave, bi-concave, and meniscus. Such not-literally-rectangular forms may result, for example, from the shape of an underlying build surface. As previously mentioned, alteration of the cross section in the aforementioned fashion facilitates consolidation of the composite filament into the geometry of the desired object.

Figure 3:
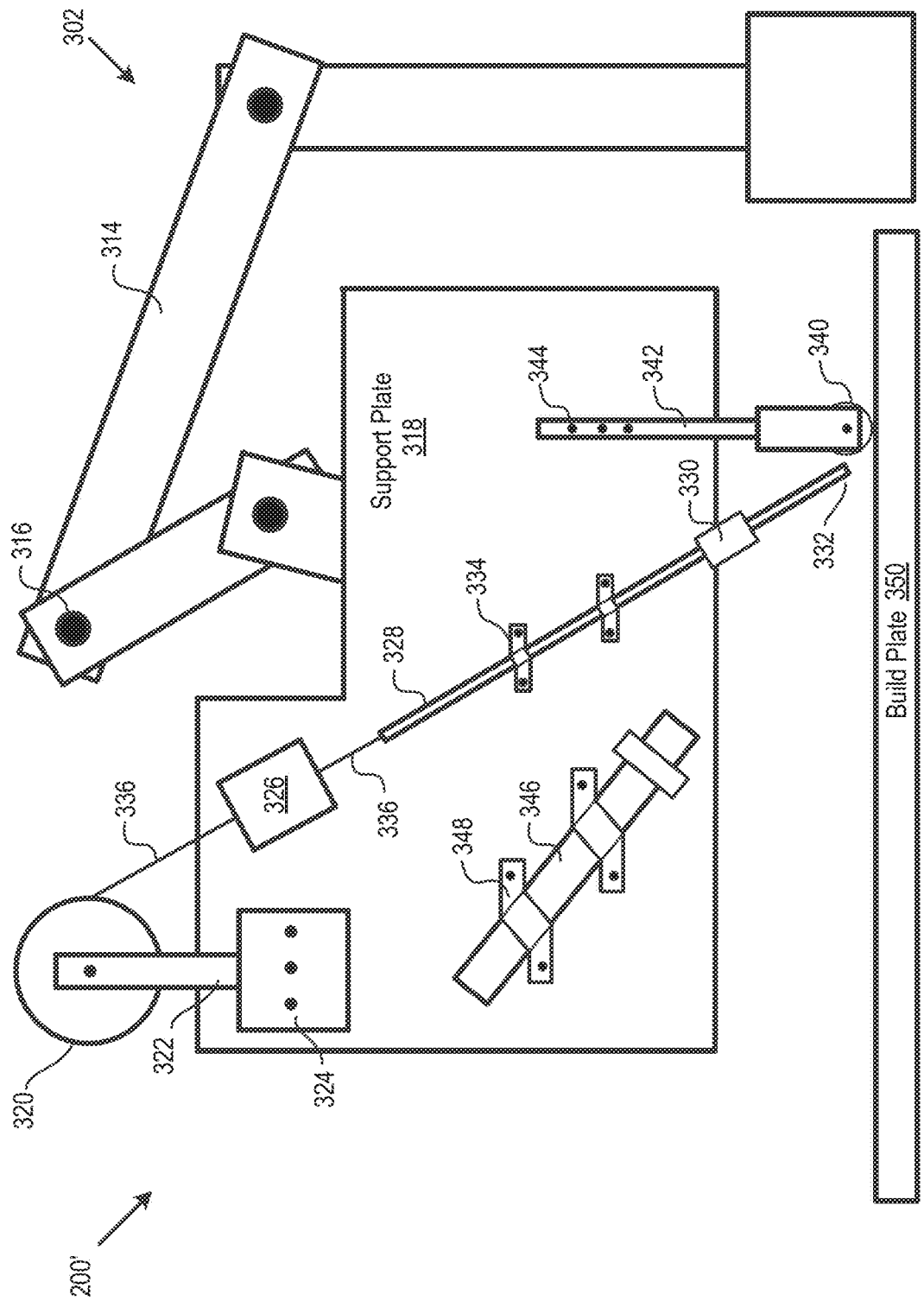
FIG. 3 depicts an illustrative embodiment of the additive manufacturing system of FIG. 2.

FIG. 3 depicts deposition system 200' in accordance with an illustrative embodiment of invention. System 200' is an implementation of system 200 depicted in FIG. 2.

In system 200', positioning subsystem 202 is embodied as notional robotic arm 302. The robotic arm is coupled to support plate 318, which supports the various subsystems and elements of system 200'. Robotic arm 302 moves support plate 318, and all subsystems/elements attached thereto, so as to position the system to deliver a composite filament to a desired point in space consistent with the build instructions for the part.

In the illustrative embodiment, robotic arm 302 is appropriately configured with rigid members 314 and joints 316 to provide six degrees of freedom (three in translation: x, y, and z axes; and three in orientation: pitch, yaw, and roll).

In system 200', feed subsystem 204 includes spool 320, feed motor 326, feed tube 328, and cutter 330. Spool 320 is rotatably coupled to member 322, the latter of which is attached (e.g., via bolts 324, etc.) to support plate 318. Composite filament 336 is wound around spool 320. The filament passes through motor 326, feed tube 328, and cutter 330. Motor 326 draws composite filament 336 from spool 320. As it passes through cutter 330, filament 336 is sized, as appropriate, in accordance with build instructions. Feed tube 328 is attached to support plate 318, such as via clamps 334.

Filament 336 is delivered to build plate 350 from delivery end 332 of feed tube 328. It will be appreciated that if manufacture of a part has already begun, filament 336 might be delivered to a previously deposited layer of composite filament. The term "build surface," as used in this disclosure and the appended claims, refers to either a build plate, etc., such as build plate 350, or a previously deposited layer of material, or anything else that filament 336 might be deposited upon.

In the illustrative embodiment, feed tube 328 is used to simply deliver and guide filament, in its original form (i.e., no change in shape, etc.) to the build plate 350. In some embodiments, feed tube 328 is not heated.

In some embodiments, delivery end 332 of the feed tube 328 is appropriately configured and/or positioned to deliver the composite filament directly underneath shaper 210, which is embodied in the illustrative embodiment as roller 340.

Roller 340 rotates about pin 341 but is otherwise rigidly coupled to support plate 318 via member 342 and bolts 344. In other words, roller 340 is free to rotate about pin 341 along the x-direction, but is rigidly coupled to support plate 318 with respect to movements along the y-direction and the z-direction.

In system 200', focused heat source 206 is embodied as laser 346, such as a diode or fiber laser, although other types of lasers may suitably be used. Laser 346 is rigidly coupled to support plate 318, such as via clamps 348.

In the illustrative embodiment, laser 346 is aligned to illuminate the portion of filament delivered to build plate 350. The laser heats the filament to softening for incorporation into the build object.

As previously noted, a laser is preferentially used as focused heat source 208 because it enables precise and accurate control of the processing temperature. Because the laser spot size can be precisely controlled, the laser can be directed to melt a previously deposited, underlying layer while simply heating the currently deposited layer until it softens. Or the laser can be directed to partially melt both the underlying and overlying layer. Again, melting the underlying layer during the deposition process results in an increase in bonding and adhesion between the layers, enhancing the overall mechanical properties of the build object.

In some other embodiments, one laser is used for softening or partially melting the just-deposited filament, while a second laser is used to at least partially melt a previously deposited layer. In some further embodiments, a focused heat source is used to melt the underlying filament, but a heat source other than a laser (not necessarily a focused heat source; for example, a hot air blower, etc.) is used to soften the filament being deposited. This can occur before directly before or after the filament is deposited.

Robotic arm 302 positions support plate 318 such that roller 340 applies pressure to the deposited filament. The applied pressure ensures that the filament sticks and adheres to the underlying layer. In the absence of such pressure, only gravity is available to bond and adhere the filament to the underlying layer, providing a relatively weak interface.

Furthermore, as previously discussed, the applied pressure reshapes the cross section of the filament from substantially circular to a flattened form. That is, the substantially cylindrical composite filament feed is transformed into a flattened substantially tape-like form.

In the prior art, wherein gravity alone is applied during deposition, the composite filament's cross section morphs from circular/rectangular to elliptical. Elliptical-shaped filaments tend to leave gaps and interstices in the build object. These gaps and interstices can act as nucleation sites for crack propagation, negatively impacting the mechanical properties of the build part. On the other hand, the flattened form in accordance with embodiments of the invention results in parts having minimal void/interstitial space. This results in printed parts having relatively better material properties.

In illustrative embodiment, there is a 1:1 input-to-output material feed rate (i.e., the cross-sectional area of the filament entering the system equals that of the filament exiting the system to create the build object). Thus, although the cross-sectional shape of the composite filament changes in accordance with the present teachings (i.e., it is flattened), the cross-section area of the filament does not change.

FIG. 4 depicts method 400 for additive manufacturing. In accordance with operation S401, a filament is deposited on the build surface or previously deposited layer of filament. In the illustrative embodiment, the filament is softened or partially melted, per operation S402. In the illustrative embodiment, the filament is softened after deposition; however, in some alternative embodiments, the filament is softened immediately prior to deposition.

The important point here is that the composite filament must retain the ability to be shapeable (i.e., re-shaped to a flattened form of desired width and/or thickness). It is notable that a liquid will take the shape of a vessel, etc., into which it is poured. That is not a contemplated embodiment; in embodiments of the invention, the composite filament retains form/shape without external constraints.

In operation S403, at least a portion of the filament underlying the most recently deposited filament is melted. Per operation S404, the feed composite filament, which typically has a substantially circular cross section, is reshaped to a flattened form having a tape-like aspect ratio. As previously noted, the width of the reshaped composite filament is at least 5 times greater than its thickness. In the illustrative embodiment, reshaping is accomplished via applied pressure; that is, by compressing the composite filament.

In some embodiments, operations S402 and S403 are performed concurrently. In some other embodiments, operation S402 is performed before operation S403. In some embodiments, operations S402, S403, and S404 are performed concurrently.

It is to be understood that although this disclosure teaches many examples of embodiments in accordance with the present teachings, many additional variations of the invention can easily be devised by those skilled in the art after reading this disclosure. As a consequence, the scope of the present invention is to be determined by the following claims.

What is claimed:

1. A system for additive manufacturing of at least a portion of a three-dimensional (3D) object, comprising:
    a build substrate configured to support said at least said portion of said 3D object;
    a feed subsystem comprising a tube or motor, wherein said feed subsystem is configured to direct at least one feedstock from a source of at least one feedstock toward said build substrate, which at least one feedstock is usable for printing said at least said portion of said 3D object;
    at least one energy source configured to soften a portion of said at least one feedstock deposited over said build substrate;
    a shaper comprising a surface configured to (i) come in contact with said portion of said at least one feedstock and (ii) apply pressure to said portion of said at least one feedstock deposited over said build substrate; and
    a controller operatively coupled to said feed subsystem, said at least one energy source and said shaper, wherein said controller is configured to (i) direct said feed subsystem to direct said at least one feedstock from said source toward said build substrate such that said at least one feedstock is deposited over said build substrate, (ii) direct said at least one energy source to soften said portion of said at least one feedstock that has been deposited over said build substrate, wherein, after softening, said portion of said at least one feedstock is shapeable, and (iii) direct said shaper to press against said portion of said at least one feedstock.

2. The system of claim 1, wherein said controller is further configured to direct said feed subsystem to deposit one or more additional layers.

3. The system of claim 1, wherein said controller is configured to direct said shaper to alter a cross sectional shape of said portion of said at least one feedstock, but a cross sectional area of said portion of said at least one feedstock is constant before and after alteration.

4. The system of claim 1, wherein said at least one energy source is a laser.

5. The system of claim 1, wherein said shaper comprises a roller.

6. The system of claim 1, wherein said at least one feedstock is a continuous tow filament.

7. The system of claim 1, further comprising a multi-axis robotic arm supporting said feed subsystem, which multi-axis robotic arm is configured to sequentially deposit said portion of said at least one feedstock.

8. A system for additive manufacturing of at least a portion of a three-dimensional (3D) object, comprising:
    a build substrate configured to support said at least said portion of said 3D object;
    a feed subsystem comprising a tube or motor, wherein said feed subsystem is configured to direct at least one feedstock from a source of at least one feedstock toward said build substrate, which at least one feedstock is usable for printing said at least said portion of said 3D object;
    at least one energy source configured to soften a portion of said at least one feedstock deposited over said build substrate;
    a shaper comprising a surface configured to fi) come in contact with said portion of said at least one feedstock and (ii) apply pressure to said portion of said at least one feedstock deposited over said build substrate; and
    a controller operatively coupled to said feed subsystem, said at least one energy source and said shaper, wherein said controller is configured to (i) direct said feed subsystem to deliver, without a change in cross-sectional area, said at least one feedstock from said source toward said build substrate such that said at least one feedstock is deposited over said build substrate and (ii) direct said at least one energy source to reshape said portion of said at least one feedstock by softening or partially melting said portion of said at least one feedstock that has been deposited over said build substrate, wherein, before reshaping, said portion of said at least one feedstock has a first cross section and after reshaping, said portion of said at least one feedstock is pressed to provide a second cross section.

9. The system of claim 8, wherein said controller is configured to direct said shaper to alter a cross sectional shape of said portion of said at least one feedstock, but a cross sectional area of said portion of said at least one feedstock is constant before and after alteration.

10. The system of claim 8, wherein said controller is further configured to direct said feed subsystem to deposit one or more additional layers.

11. The system of claim 8, wherein said at least one energy source is a laser.

12. The system of claim 8, wherein said shaper comprises a roller.

13. The system of claim 8, wherein said at least one feedstock is a continuous tow filament.

14. The system of claim 8, further comprising a multi-axis robotic arm supporting said feed subsystem, which multi-axis robotic arm is configured to sequentially deposit said portion of said at least one feedstock.

15. A system for additive manufacturing of at least a portion of a three-dimensional (3D) object, comprising:
    a build substrate configured to support said at least said portion of said 3D object;
    a feed subsystem comprising a tube or motor, wherein said feed subsystem is configured to direct at least one feedstock from a source of at least one feedstock toward said build substrate, which at least one feedstock is usable for printing said at least said portion of said 3D object;
    at least one energy source configured to soften a portion of said at least one feedstock deposited over said build substrate;
    a shaper comprising a surface configured to (i) come in contact with said portion of said at least one feedstock and (ii) apply pressure to said portion of said at least one feedstock deposited over said build substrate; and
    a controller operatively coupled to said feed subsystem, said at least one energy source and said shaper, wherein said controller is configured to (i) direct said feed subsystem to direct an additional feedstock toward said at least one feedstock such that said additional feedstock is deposited over said at least one feedstock, (ii) direct said at least one energy source to melt an upper portion, but not all, of said at least one feedstock, and (iii) direct said at least one energy source to melt a lower portion, but not all, of said additional feedstock that has been deposited over said at least one feedstock, wherein, after melting, said lower portion of said additional feedstock is shapeable; and (iv) direct said shaper to press against said additional feedstock.

16. The system of claim 15, wherein said controller is configured to direct said shaper to alter a cross sectional shape of said at least one feedstock or said additional feedstock, but a cross sectional area of said at least one feedstock or said additional feedstock is constant before and after alteration.

17. The system of claim 15, wherein said at least one energy source is a laser.

18. The system of claim 15, wherein said shaper comprises a roller.

19. The system of claim 15, wherein said at least one feedstock is a continuous tow filament.

20. The system of claim 15, further comprising a multi-axis robotic arm supporting said feed subsystem, which multi-axis robotic arm is configured to sequentially deposit said at least one feedstock or said additional feedstock.

* * * * *